Nov. 11, 1952 R. F. HELMKAMP 2,617,644
UNIVERSAL GAS TORCH CUTTING MACHINE
Filed April 9, 1949

INVENTOR
RICHARD F. HELMKAMP
BY
ATTORNEYS

Patented Nov. 11, 1952

2,617,644

UNITED STATES PATENT OFFICE 2,617,644

UNIVERSAL GAS TORCH CUTTING MACHINE

Richard F. Helmkamp, Jersey City, N. J., assignor to Air Reduction Company, Incorporated, a corporation of New York Application April 9, 1949, Serial No. 86,433

2 Claims. (Cl. 266—23)

This invention relates to universal gas torch cutting machines, and more particularly to that type in which a carriage is supported on and guided longitudinally along a monorail, a transversely extending bar which carries a torch and a tracer being mounted on the carriage so that it can slide longitudinally. In such a machine the tracer and torch are, of course, capable of universal movement in a horizontal plane and a pattern traced by the tracer will be duplicated by the torch.

It is desirable, in a universal gas cutting machine of the kind above referred to, to make some provision for allowing the bar which carries the tracer and torch to rock in a vertical plane so that the tracer can accommodate itself to irregularities in the surface on which it travels. This is usually accomplished by mounting the bar in a slide box and pivotally connecting the slide box to the carriage which moves on the monorail. However, if this is done it is obvious that the tracer cannot lend any transverse stability to the carriage on the monorail, as it would do if the slide box were rigid with the carriage, and therefore transverse stability of the carriage must be provided for in other ways as by arranging the carriage wheels so that they grip the monorail, and by giving the monorail an appropriate shape for this purpose.

The principal object of this invention is to provide, in a universal gas cutting machine of the monorail type, improved and simple means for allowing the tracer and torch bar to rock in a vertical plane during operation of the machine without the employment of a pivotal connection between the bar mounting and the carriage such as would prevent the tracer from giving transverse stability to the carriage.

A further object is to provide an improved universal gas cutting machine of the monorail type which is of simple construction and which may be easily assembled and dismantled.

According to the invention, in its preferred form a monorail is employed having a curved or round top surface on which the wheels of the carriage roll. The carriage has at least two laterally spaced wheels arranged to roll on the monorail along paths lying at opposite sides of the crest of its top curved surface to thereby guide the carriage on the monorail. Preferably the two wheels rotate in downwardly converging inclined planes so that the plane of rotation of each wheel is substantially normal to the portion of the curved surface of the monorail on which it rolls. In order to give the carriage fore- and-aft stability on the monorail there may be two pairs of such wheels spaced apart longitudinally of the monorail, or the fore-and-aft stability of the carriage may be furnished in any other suitable way. The transversely extending bar carrying the tracer and torch is mounted on the carriage to slide longitudinally. Thus components of movement of the tracer which are in the direction in which the monorail extends will be permitted by movement of the carriage along the monorail, and transverse components of movement of the tracer will be permitted by sliding movement of the tracer and torch bar in its mounting. The mounting for the tracer and torch bar is not pivotally connected with the carriage as is usually the case in previous machines of this type but is rigid with the carriage. Therefore, any irregularities in the surface on which the tracer travels will rock the tracer and torch bar in a vertical plane and will shift the carriage laterally and arcuately a short distance on the monorail, this being permitted by the above-mentioned arrangement of the carriage wheels and the curved upper surface of the monorail on which they roll.

The invention makes possible the use of a simple and readily available type of monorail because ordinary round pipe or a solid bar or rod of circular cross-section will suffice for the rail. It may be supported on simple cradlelike blocks or brackets which leave the top curved surface of the pipe or bar exposed for the travel thereon of the carriage wheels. It should be understood, however, that any suitably supported monorail, at least the top surface of which is curved or formed so that the carriage can rock about an axis extending longitudinally of the monorail, may be used.

Other objects and advantages of the invention will be clear from the following description and accompanying drawing, in which.

Figure 1:
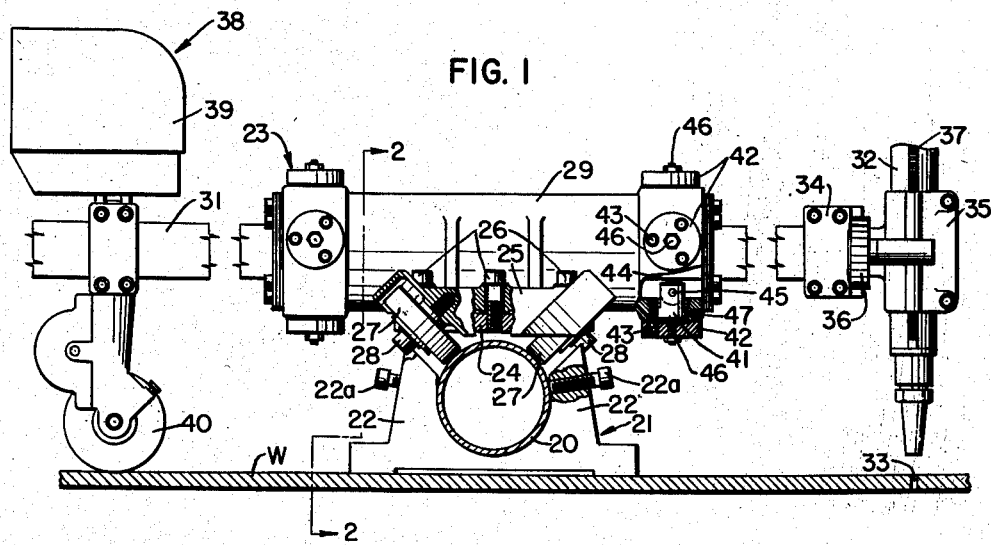
Figure 1 is an end view of a universal gas cutting machine of the monorail type embodying the invention, certain parts of the machine being shown in vertical section.

Referring to the drawings, the monorail is shown at 20. As above stated, it may be a member having a circular cross-section such as a cylindrical pipe, and is so shown in the drawing. The monorail is supported on blocks or brackets 21 each of which has upwardly extending laterally spaced portions 22 that form a cradle which receives the monorail. Set screws 22a are preferably provided in the portions 22 of the blocks by means of which the monorail can be clamped in the blocks. The monorail may be supported directly on the workpiece W on which the pattern to be traced is also marked, or the monorail and pattern may be supported independently of the workpiece and the workpiece may be supported in any suitable way adjacent the monorail.

Figure 2:
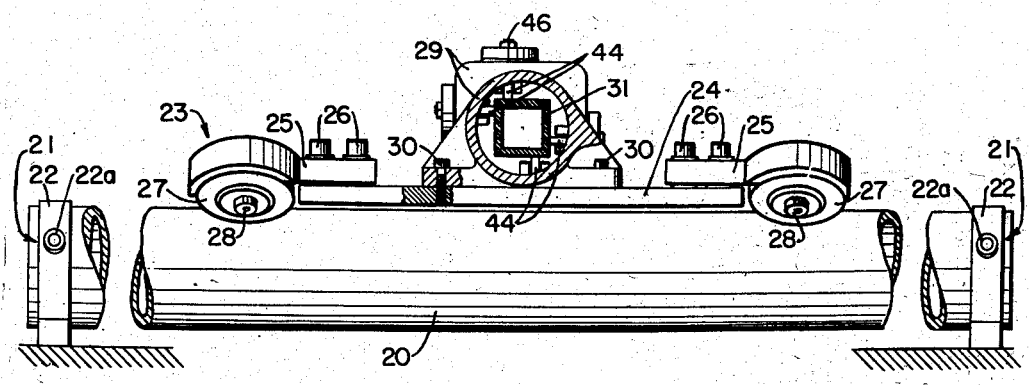
Fig. 2 is a vertical section taken on the line 2—2 of Fig. 1.

The carriage, which is movably mounted on the monorail, is denoted in general by the reference numeral 23. It comprises a base plate 24 at each end of which there is attached a wheel-supporting member 25 by means of bolts 26 (Fig. 2). Each of the wheel-supporting members 25 is provided with a pair of wheels 27 (Fig. 1) that are journalled on axle pins 28 screwed into opposite sides of the member 25. As best shown in Fig. 1, the two wheels of each pair are laterally spaced so that they roll on the monorail along paths which lie at opposite sides of the crest or high point of the curved surface of the monorail and thus they guide the carriage along the monorail. The wheels are preferably so attached to the wheel-supporting members 25 by the axle pins 28 that each wheel rotates in an inclined plane which is substantially normal to the portion of the curved surface of the monorail with which it engages. This causes the two wheels of each pair to rotate in downwardly converging inclined planes as will be clear from Fig. 1.

A slide box 29 forms part of the carriage and is mounted on the base plate 24 thereof by means of bolts 30 (Fig. 2) so that its axis extends transversely of the monorail. A tracer and torch bar 31, preferably square in cross-section, is mounted to slide longitudinally in the slide box. The bar 31 carries a cutting torch 32 (Fig. 1) of the conventional type adapted to thermochemically cut the workpiece as shown at 33. The torch 32 may be secured to the bar 31 in the usual way by a clamp bracket 34 which carries a sleeve or torch holder 35 in which the torch can be adjusted vertically by turning an adjusting knob 36 that rotates a pinion whose teeth engage with rack teeth 37 on the side of the torch. Also secured to the bar 31 is a tracer denoted in general by the reference number 38. It may be a well-known type having a motor 39 which drives a traction wheel 40. The tracer may be the manually steered type or the automatically steered type. In either case, when the traction wheel is driven by the motor 38 to propel it along the pattern surface, the mounting of the traction wheel is turned about its vertical axis to steer the traction wheel and cause the tracer to follow the line of the pattern. The torch 32 will cut a pattern in the workpiece which is an exact duplicate of the pattern traced by the tracer, each component of motion of the tracer and the torch in the direction in which the monorail extends being permitted by movement of the carriage 23 along the monorail and each transverse component of movement of the tracer and torch being permitted by movement of the bar 31 through the slide box 29.

The slide box 29 preferably contains a number of antifriction bearings which support the bar 31 and permit it to move freely in the slide box. As shown in Fig. 1, each antifriction bearing may comprise a bearing block 41 mounted in an opening in a side wall of the slide box 29, a retaining cap 42 being provided to cover the outer end of the opening. The retaining cap is held in place by a number of screws 43. The inner end of the bearing block is bifurcated to accommodate a wheel or roller 44 which turns on an axle pin 45 and engages one of the faces of the bar 31. The bearing block 41 is preferably mounted for sliding movement in the opening which receives it, and a screw 46, threaded through the retaining cap 42, is provided whereby the bearing block may be adjusted inwardly toward the corresponding face of the bar 31. A screw 47 threaded through the end wall of the slide box 29 projects into a slot in the side of the bearing block 41 and holds the block against rotation when the screw 46 is turned to adjust the position of the bearing block. There are preferably four of the antifriction bearings at each end of the slide box 29. It will be noted from Fig. 2 that at each end of the slide box two of the rollers engage two contiguous surfaces of the bar 31 near one corner of the bar, and the other two rollers engage the other two contiguous surfaces of the bar near its diagonal opposite corner. By this arrangement the tortional forces produced on the bar by the torch members supported by it are best resisted and the bar is held securely and firmly while being free to move freely through the slide box.

The adjustable feature of the antifriction bearings permits the use of tracer-torch bars of various sizes and also provides means for compensating for play or misalignment which may occur after the apparatus has been in use for some time.

It will now be seen that since the slide box 29 is rigidly attached to the base plate 24 of the carriage, and not pivotally associated with the carriage as in previous machines of the same general type, the tracer 38 contributes toward transverse stability of the carriage on the monorail. However, the tracer and torch bar 31 is permitted to move in a vertical plane because of the type of monorail employed, the arrangement of the carriage wheels, and the fact that the mounting for the tracer and torch bar is a rigid part of the portion of the carriage which carries the wheels. Vertical movement of the tracer caused by irregularities in the surface on which it travels will simply shift the carriage laterally in an arcuate path on the top rounded surface of the monorail. When the carriage is thus shifted laterally on the monorail the wheels 27 slide laterally a short distance on its curved top surface. However, the arrangement of the wheels is such that the carriage will always be properly guided lengthwise of the monorail and will be maintained in parallel relation with it by the two pairs of wheels. Since the carriage is stable on the monorail in all directions and no means need be provided on the carriage for gripping the rail, only the top portion of the rail need be free of obstruction to provide a path of travel for the carriage wheels. Therefore, the monorail may be supported in cradlelike supporting blocks or brackets of the kind previously described.

Figure 3:
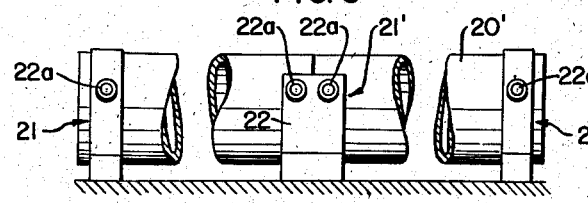
Fig. 3 is a broken side elevation of the monorail and the supporting blocks or brackets in which it is mounted and illustrating a special type of supporting block which may be used at the juncture of two monorail sections when the monorail is made up of more than one section.

When the blocks or brackets 21 that support the monorail are positioned near the ends of the monorail as shown in Fig. 2, or at points which define the desired range of movement of the carriage along the monorail, the side portions 22 on them may extend upwardly far enough so that their upper ends lie in the path of travel of the outer ends of the axle pins 28 and therefore constitute stops which prevent movement of the carriage beyond the ends of the monorail or beyond the points which define its predetermined range of movement. If desired, two rail lengths 20 and 20' may be positioned end-to-end to form an elongated monorail as shown in Fig. 3, and in this case a special form of supporting block or bracket 21' may be employed at the juncture between the two rail sections. The block 21' may be similar to the end supporting blocks 21 previously described except that its upwardly extending side portions 22 are shorter so that they do not obstruct the movement of the carriage but permit it to move the entire length of the composite monorail between the stops on the end supporting blocks. Moreover, the block 21' may be thick enough to accommodate two of the set screws 22a in each of its upwardly extending portions 22 for gripping the two abutting ends of the rail sections.

The monorail and its supporting blocks constitute a simple and inexpensive form of track for the carriage, it being only necessary to support a rail having a circular cross-section, such as an ordinary pipe, in cradlelike blocks, and since the carriage is not in any way gripped by the monorail it can be freely lifted off of the monorail and positioned on it whenever desired.

I claim:

1. A universal gas cutting machine comprising a monorail supported in a horizontal position and having a curved top surface, a carriage having laterally spaced wheels to continuously support the carriage from the monorail, said wheels being arranged to continuously contact and to roll along the curved top surface of the monorail at opposite sides of the crest thereof and thereby render the carriage movable along and guidable by the monorail, said wheels being mounted to rotate in downwardly converging inclined planes so that the plane of rotation of each wheel is substantially normal to the portion of the curved top surface of the monorail on which it rolls, a transversely extending bar carried by the carriage, the carriage wheels and curved top surface of the monorail permitting the carriage to shift laterally on the top surface of the monorail while the wheels maintain their supporting contact with the monorail, said transversely extending bar being mounted on the carriage so that it can slide longitudinally relative to the carriage but will shift the carriage laterally on the curved top surface of the monorail when the bar is rocked in a vertical plane, a tracer carried by said bar at one side of the carriage and having a power driven traction wheel adapted to roll on a surface containing a pattern to be traced by the tracer, and a torch carried by said bar at the other side of the carriage and being free during operation of the machine to move toward and away from the surface of the work to thereby permit rocking of said bar in a vertical plane and lateral shifting of the carriage on the monorail in response to irregularities in said surface over which the traction wheel of the tracer moves during operation of the machine.

2. A universal gas cutting machine in accordance with claim 1 in which there are two pairs of said laterally spaced wheels on the carriage spaced apart longitudinally of the monorail.

RICHARD F. HELMKAMP.

REFERENCES CITED

The following references are of record in the file of this patent:

UNITED STATES PATENTS

| Number | Name | Date |
|---|---|---|
| 1,901,254 | Messer | Mar. 14, 1933 |
| 2,269,636 | Mott | Jan. 13, 1942 |
| 2,477,041 | Bucknam et al. | July 26, 1949 |

FOREIGN PATENTS

| Number | Country | Date |
|---|---|---|
| 574,817 | Germany | Apr. 20, 1933 |
| 653,397 | Germany | Nov. 23, 1937 |
| 588,188 | Germany | Nov. 16, 1933 |
| 794,441 | France | Dec. 12, 1935 |